United States Patent [19]

Hefner, Jr.

[11] Patent Number: 4,847,337
[45] Date of Patent: Jul. 11, 1989

[54] POLYSTYRENE MODIFIED ADVANCED EPOXY RESIN AND POLYESTER COPOLYMERS

[75] Inventor: Robert E. Hefner, Jr., Lake Jackson, Tex.

[73] Assignee: The Dow Chemical Company, Midland, Mich.

[21] Appl. No.: 918,402

[22] Filed: Oct. 14, 1986

Related U.S. Application Data

[63] Continuation-in-part of Ser. No. 791,176, Oct. 24, 1985, abandoned.

[51] Int. Cl.$^4$ ............................................. C08G 59/16
[52] U.S. Cl. ..................................... 525/531; 525/934
[58] Field of Search ...................... 525/531, 529, 530

[56] References Cited

U.S. PATENT DOCUMENTS

| | | | |
|---|---|---|---|
| 29,014 | 10/1976 | Pizzini et al. | 525/531 |
| 4,161,468 | 7/1979 | Davis et al. | 525/529 |
| 4,308,185 | 12/1981 | Evans et al. | 525/530 |
| 4,399,241 | 8/1983 | Ting et al. | 525/529 |
| 4,482,671 | 11/1984 | Woo et al. | 525/531 |

FOREIGN PATENT DOCUMENTS

| | | | |
|---|---|---|---|
| 1220786 | 1/1971 | United Kingdom | 525/530 |
| 85/00610 | 2/1985 | World Int. Prop. O. | 525/530 |

*Primary Examiner*—John C. Bleutge
*Assistant Examiner*—robert E. L. Sellers, II

[57] ABSTRACT

Advanced epoxy resin and polyester blends suitable for use in powder coatings are prepared by (I) polymerizing, in the presence of a suitable catalyst such as tertiary butyl perbenzoate, (A) the reaction product of (1) a diglycidyl ether of a dihydric phenol such as the diglycidyl ether of bisphenol A and with (2) a compound containing a group reactive with an epoxide group and a polymerizable ethylenically unsaturated group such as methacrylic acid; with (B) a monomer feed containing (1) at least one vinyl aromatic monomer such as styrene; (2) a compound containing a group reactive with an epoxide group and a polymerizable ethylenically unsaturated group such as methacrylic acid; and optionally (3) a hydroxyalkyl acrylate or methacrylate or an alkyl acrylate or methacrylate such as hydroxyethylacrylate; and (II) advancing, in the presence of a suitable advancement catalyst such as ethyltriphenylphosphonium acetate acetic acid complex, the resultant polymerized product with (C) a dihydric phenol such as bisphenol A and (III) combining the resulting advanced epoxy resin from step (II) with (D) an acid and/or hydroxyl functional polyester in an amount sufficient to provide a mole ratio of epoxide groups to acid and/or hydroxyl groups of from about 0.9 to 1 to about 1.1 to 1.

16 Claims, No Drawings

POLYSTYRENE MODIFIED ADVANCED EPOXY RESIN AND POLYESTER COPOLYMERS

CROSS REFERENCE TO RELATED APPLICATION

This application is a continuation-in-part of application Ser. No. 791,176 filed Oct. 24, 1985, now abandoned.

BACKGROUND OF THE INVENTION

Copolymerization of advanced epoxy resins and polyesters containing hydroxyl or carboxylic acid groups is well known to the prior art to provide cured decorative powder coatings. Said powder coatings possess many usable properties, however, deficiencies in aqueous corrosion resitance to both acid and alkali are frequently apparent thus limiting their use.

The present invention provides polystyrene modified advanced epoxy resin and polyester copolymers with improved aqueous corrosion resistance to both acid and alkali, as well as improved reactivity while maintaining other properties such as, for example, impact resistance.

SUMMARY OF THE INVENTION

One aspect of the present invention pertains to an advanced epoxy resin and polyester blend which comprises the product resulting from (I) polymerizing in the presence of a catalytic quantity of a suitable polymerization catalyst
(A) the reaction product of
  (1) at least one diglycidyl ether of a dihydric phenol with
  (2) at least one compound containing a group relatively with an epoxide group and a polymerizable ethylenically unsaturated group in an amount of from about 0.001 to about 0.05, preferably from about 0.005 to about 0.025, equivalent per epoxide equivalent contained in component (A-1); with
(B) a monomer feed containing
  (1) at least one vinyl aromatic monomer in an amount of from about 31 to about 60, preferably from about 35 to about 45, percent by weight of the total weight of components (A), (B) and (C);
  (2) at least one compound containing a group reactive with an epoxide group and a polymerizable ethylenically unsaturated group in an amount of from about 0.001 to about 0.05, preferably from about 0.005 to about 0.025, equivalent per epoxide equivalent contained in component (A-1); and optionally
  (3) a hydroxyalkyl acrylate or methyacrylate or an alkyl acrylate or methacrylate or any combination thereof in an amount of from about zero to about 15, preferably from about 1 to about 5, percent by weight based on total weight of components (B-1) and (B-3); and
(II) advancing, in the presence of a catalytic quantity of a suitable advancement catalyst, the polymerized product from step (I) with
(C) at lest one dihydric phenol in an amount of from about 0.125 to about 0.80, preferably from about 0.375 to about 0.50 hydroxyl equivalents per epoxide equivalent contained in component (A-1); and
(III) combining the advanced epoxy resin from step (II) with
(D) at least one acid functional polyester or hydroxyl functional polyester or a combination thereof in an amount sufficient to provide a mole ratio of epoxide groups contained in the product produced in step (II) to acid and/or hydroxyl groups of from about 0.9:1 to about 1.1:1.

Another aspect of the present invention concerns powder coating compositions and other products resulting from curing the aforementioned advanced epoxy resin and polyester blends.

DETAILED DESCRIPTION OF THE INVENTION

Suitable diglycidyl ethers of a dihydric phenol which can be employed herein include, for example, those represented by the formulas

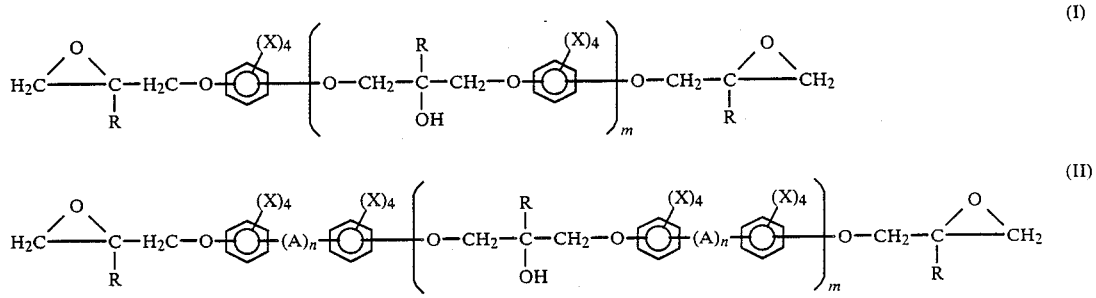

wherein A is a divalent hydrocarbon group having from one to about 10 carbon atoms,

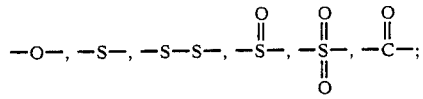

each X is independently hydrogen, bromine, chlorine, or a hydrocarbyl or hydrocarbyloxy group having from 1 to about 10 carbon atoms; each R is independently hydrogen or a methyl group; m has a value from zero to about 5, preferably from about zero to about 3 and n has a value of zero or 1.

The term hydrocarbyl as employed herein means any aliphatic, cylcoaliphatic, aromatic, aryl substituted aliphatic, or aliphatic substituted aromatic groups. Likewise, the term hydrocarbyloxy group means a hydrocarbyl group having an oxygen linkage between it and the object to which it is attached.

Suitable diglycidyl ethers of a dihydric phenol which can be employed herein include, for example, the diglycidyl ethers of resorcinol, hydroquinone, catechol, bisphenol A (4,4'-isopropylidenediphenol), bis(4,4'-dihydroxyphenyl)methane, 2,2'-bis(4-hydroxyphenyl)pentane, 3,3',5,5'-tetramethyl-4,4'-dihydroxydiphenyl, 4,4'-dihydroxydiphenyl sulfone, 4,4'-dihydroxybenzophenone, 3,3',5,5'-tetrabromo-4,4'-isopropylidenediphenol, 4,4'-bis(p-hydroxyphenyl)diphenyl ether, 4,4'-dihydroxydiphenyl sulfide, mixtures thereof and the like. Most preferred as the diglycidyl ether of a dihydric phenol are the diglycidyl ethers of bisphenol A.

Suitable compounds which contain both a group reactive with an epoxide group and a polymerizable ethylenically unsaturated group include compounds wherein said group reactive with an epoxide group is a compound containing a carboxylic acid, hydroxyl or amido group. Suitable compounds which contain both a group reactive with an epoxide group and a polymerizable ethylenically unsaturated group include, for example, the acrylic acids, such as, for example, acrylic acid and methacrylic acid the monoesters of $\alpha$, $\beta$-unsaturated dicarboxylic acids, such as monomethyl maleate and monobutylfumarate; the alkenylphenols such as, for example, p-isopropenylphenol and m-vinylphenol; the hydroxyalkyl acrylates such as, for example, 2-hydroxyethyl acrylate, 2-hydroxyethyl methacrylate, 2-hydroxyethyl acrylate, 2-hydroxypropyl methacrylate, 2-hydroxybutyl acrylate, 2-hydroxybutyl methacrylate and the acrylamides such as, for example, methacrylamide and acrylamide, any combination thereof and the like. Most preferred as the compound containing a group reactive with an epoxide group and a polymerizable ethylenically unsaturated group is methacrylic acid.

The prereaction (step A) of the diglycidyl ether of a dihydric phenol and a compound which contains both a group reactive with an epoxide group and a polymerizable ethylenically unsaturated group is performed at a temperature of from about 75° to about 200° C., preferably from about 140° to about 160° C. for from about 15 (900 s) to about 150 minutes (9000 s), preferably for from about 30 (1800 s) to about 60 minutes (3600 s). The prereaction step times and temperatures vary as a function of the type of compound which contains both a group reactive with an epoxide group and a polymerizable ethylenically unsaturated group that is used.

A catalyst may optionally be employed to facilitate reaction of the group reactive with an epoxide group and the epoxide group. Generally, a catalyst is not required and, furthermore, is not desired when said group reactive with an epoxide group is —COOH. It may, however, be beneficial to use a catalyst when said group reactive with an epoxide group is, for example, —OH. Typical of such catalysts useful for this purpose are the advancement catalysts described herein.

Suitable vinyl aromatic monomers which can be employed as component (B-1) in the copolymerization reaction step with the prereaction product of a diglycidyl ether of a dihydric phenol and a compound containing both a group reactive with an epoxide group and a polymerizable ethylenically unsaturated group include those represented by the formula

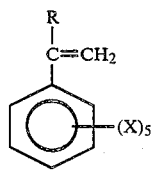

(III)

wherein R and X are as hereinbefore defined.

Representative of the vinyl aromatic monomers which can be employed herein are, for example, styrene, chlorostyrenes, methylstyrenes, t-butylstyrenes, α-methylstyrene, methoxystyrenes, mixtures thereof and the like. Most preferred as the vinyl aromatic monomer is styrene.

Suitable hydroxyalkyl acrylates or methacrylates, alkyl acrylates or methacrylates or mixtures thereof which can be employed as component (B-3) in the copolymerization reaction step with the prereaction product of a diglycidyl ether of a dihydric phenol and a compound containing both a group reactive with an epoxide group and a polymerizable ethylenically unsaturated group include, for example, hydroxyalkyl acrylates or methacrylates, alkyl acrylates or methacrylates or mixtures thereof. The specific amount and type of said acrylates or methacrylates may be chosen so as to effect the final properties of a cured powder coating. Small amounts (about 0.25 to about 2 percent by weight based on total weight of monomer feed used) of a hydroxyalkyl acrylate or methacrylate are used to increase adhesion of the powder coating to metal substrates. Larger amounts (about 2.1 to about 15 percent by weight based on total weight of monomer feed used) of a hydoyalkyl acrylate or methacrylate increase the gloss of the powder coating. The alkyl acrylates or methacrylates, especially those possessing 8 or more carbon atoms, are used in small amounts (about 1 to about 5 percent by weight based on taotal weight of monomer feed used) to decrease the glss of the powder coating. Larger amounts (about 5.1 to about 15 percent by weight based on total weight of monomer feed used) of certain alkyl acrylates or methacrylates can be used to also impart modified texture to the powder coating. Combinations of said acrylates and methacrylates may also be used. Specific hydroxyalkyl acrylates or methacyrlates, alkyl acrylates or methacrylates which can optionally be employed herein include those represented by the formula

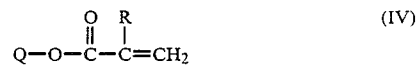

(IV)

wherein R is as hereinbefore defined and Q is a monovalent hydrocarbyl group having from one to about 25 carbon atoms or a hydroxyalkyl group having from two to about 25 carbon atoms and may be branched, cyclic or polycyclic. Representative of the hydroxyalkyl acrylates or methacyrlates, alkyl acrylates or methacrylates or mixtures thereof which can optionally be employed herein are, for example, 2-hydroxyethyl acrylate, 2-hydroxyethyl methacrylate, 2-hydroxypropyl acrylate, 2-hydroxybutyl acrylate, 2-hydroxybutyl methacylate, cyclohexyl acrylate, lauryl methacrylate, stearyl acrylate, mixtures thereof and the like.

Suitable free radial forming catalysts which can be employed in the copolymerization reaction step with the prereaction product of a diglycidyl ether of a dihydric phenol and a compound containing both a group reactive with an epoxide group and a polymerizable ethylenically unsaturated group include the azo and diazo compounds as well as the organic peroxides and hydroperoxides. Suitable free radical forming catalysts include, for example, 2,2'-azobisisobutyronitrile, 2,2'-azobis(2,4-dimethyl-4-methoxyvaleronitrile), 1-t-butylazo-1-cyanocyclohexane, t-butylperbenzoate, t-butylperoctoate, t-butylhydroperoxide, di-t-butylperoxide, dicumylperoxide, cumene hydroperoxide, mixtures thereof and the like. An amount of from about 1.0 to about 5.0, preferably from about 2.0 to about 3.0 percent by weight, based on total weight of monomer feed used, of at least one free radical forming catalyst is employed.

The copolymerization reaction of the prereaction product (A) of a diglycidyl ether of a dihydric phenol and a compound containing both a group reactive with an epoxide group and a polymerizable ethylenically unsaturated group with a monomer feed consisting of (B-1) a vinyl aromatic monomer, (B-2) a compound containing both a group reactive with an epoxide group, and a polymerizable ethylenically unsaturated group, and optionally, (B-3) a hydroxyalkyl acrylate or methacrylate, an alkyl acrylate or methacrylate, or a mixture thereof may be completed using a variety of reaction sequences. Generally, the monomer feed (B) containing a free radical forming polymerization catalyst is added to the prereaction product (A) over a period of from about 45 minutes (2700 s) to about 150 minues (9000 s), preferably from about 75 minutes (4500 s) to about 120 minutes (7200 s) while maintaining a reaction temperature of from about 125° to about 175° C., preferably from about 140° to about 160° C. A post reaction of from about 30 minutes (1800 s) to about 150 minutes (9000 s), preferably from about 45 minutes (2700 s) to about 90 minutes (5400 s) is completed after completion of the monomer feed addition.

It is necessary to maintain an inert atmosphere throughout the copolymerization reaction. This is achieved by blanketing the reaction mixture with nitrogen, argon or some other inert gas. Adequate stirring is required to intimately mix and disperse the reactants.

In an equally preferred process of the present invention, the free radical forming catalyst may be removed as a component of the monomer feed and added to the reaction mixture separately. If this is done, it is generally desirable to maintain concurrent addition of the free radical forming catalyst and the remaining monomer feed (B-1, B-2 and, optionally, B-3). The rate of this concurrent addition should be adjusted such that an excess of unpolymerized monomer feed does not accumulate.

As a further embodiment of the present invention, a portion of free radical forming catalyst may be added to the reaction mixture at the end of the monomer feed addition, more preferably about 15 minutes (900 s) to about 120 minutes (7200 s) after completion of the monomer feed addition. This is done if unpolymerized monomer feed is present and allows for completion of the copolymerization reaction.

The advancement reaction of the aforementioned copolymerization product of (A) and (B) with a dihydric phenol is performed in the presence of an advancement catalyst. Suitable dihydric phenols include, for example, those represented by the formulas

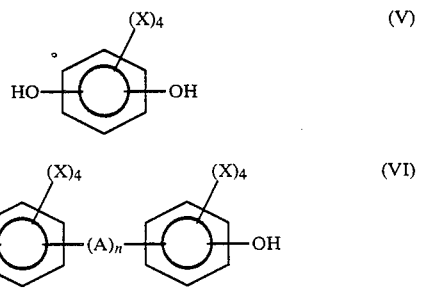

wherein X, A and n are as hereinbefore defined. Representative of the bisphenols are resorcinol, hydroquinone, catechol, bisphenol A (4,4'-isopropylidenediphenol), bis(4,4'-dihydroxyphenyl)methane, 2,2'-bis(4-hydroxyphenyl)pentane, 3,3',5,5'-tetramethyl-4,4'-dihydroxydiphenyl, 4,4'-dihydroxydiphenyl sulfone, 4,4'-dihydroxybenzophenone, 3,3',5,5'-tetrabromo-4,4'-isopropylidenediphenol, 4,4'-bis(p-hydroxyphenyl)diphenyl ether, 4,4'-dihydroxydiphenyl suflide, mixtures thereof and the like. Most preferred as the bisphenol is bisphenol A.

Suitable advancement catalysts which can be employed in the process of the present invention include most any catalyst which will catalyze the reaction between a vicinal epoxy group and a phenolic hydroxyl group. Such catalysts include, for example, those disclosed in U.S. Pat. Nos. 3,306,872; 3,341,580; 3,379,684; 3,477,990; 3,547,881; 3,637,590; 3,843,605; 3,944,855; 3,956,237; 4,048,141; 4,093,650; 4,131,633; 4,132,706; 4,171,420; 4,177,216 which are incorporated herein by reference.

Particularly suitable catalysts are the quaternary phosphonium and ammonium compounds such as, for example, ethyltriphenylphosphonium chloride, ethyltriphenylphosphonium bromide, ethyltriphenylphosphonium iodide, ethyltriphenylphosphonium acetate, ethyltriphenylphosphonium acetate.acetic acid complex, ethyltriphenylphosphonium phosphate, tetrabutylphosphonium chloride, tetrabutylphosphonium bromide, tetrabutylphosphonium iodide, tetrabutylphosphonium acetate, tetrabutylphosphonium acetate.acetic acid complex, butyltriphenylphosphonium tetrabromobisphenate, butyltriphenylphosphonium bisphenate, butyltriphenylphosphonium bicarbonate, benzyltrimethylammonium chloride, tetramethylammonium hydroxide, mixtures thereof and the like.

After completion of either the copolymerization reaction (I) or the advancement reaction (II), it is generally beneficial, although not required, to subject the reaction product to a vacuum stripping step. This is accomplished by pulling a vacuum on the reactor, thus removing and condensing any materials which volatilize from the reaction product.

In a variation on this vacuum stripping step, various modifying agents or additives, such as, for example, flow control agents, gloss control agents, pigments, texture control additives, air release agents, mixtures thereof and the like may added to the reaction product prior to the vacuum stripping step. This allows for removal of any volatile components contributed by said additives.

Suitable carboxylic acid and/or hydroxyl functional polyesters which are combined with the advanced epoxy resgins are prepared using methods well known to the art. Typical of these methods and the polyesters resulting therefrom are those described in *Kirk-Othmer Encyclopedia of Chemical Technology*, Second Edition, Volume 16, Interscience Publishers, pp. 159-189 (1968) and *Encyclopedia of Polymer Science and Technology*, Volume 11, Interscience Publishers, pp. 62-128 (1969) which are incorporated herein by reference.

Especially suitable polyesters include those prepared by reaction of neopentyl glycol and terephthalic acid; neopentyl glycol, terephthalic acid and trimethylolpropane; neopentyl glycol, terephthalic acid and trimellitic anhydride; neopentyl glycol, terephthalic acid and isophthalic acid; and neopentyl glycol, terephthalic acid and trimellitic anhydride.

Formulating methods well known to the prior art are employed to prepare the powder coating formulations of the present invention. Preparation of typical epoxy resin based powder coating formulations are described in *Fundamentals of Powder Coating* by Miller and Taft, 1974, Society of Manufacturing Engineers, Dearborn, Michigan which is incorporated herein by reference.

In the general method of preparation, the solid epoxy resin product is flaked or ground then dry mixed or blended with a non-sintering polyester and optionally, one or more accelerators or catalysts, particulate fillers, pigments, flow control agents, gloss control additives, texture control additives and air release agents. The dry mixed product is then hot melt blended typically by use of a kneading-type extruder. The extruded product passes through chilled rollers and is then recovered and crushed to a rough powder. Further grinding to a fine powder is accomplished via use of a high speed hammer mill or other type of grinding equipment. The resulting fine powder is subjected to a size classification step to recover the desired range of product particle size. The desired product size distribution for the product may vary depending on the intended end use of the product, but generally, sizes between about 80 mesh to about 325 mesh are most desired. Well known methods that are suitable for use in size classifying powder coating formulatios include screening and air classification.

The resulting powder coating formulation is applied to the substrate to be coated using methods well known to the prior art. These methods are delineated in detail by the aforementioned Miller and Taft reference and include powder dusting, fluidized bed processes, electrostatic powder spraying, electrostatic fluidized bed processes, and others.

The powder coated article is cured using methods and conditions well known to the prior art. This typically involves heating in an oven for an amount of time sufficient to complete the cure. When used with the epoxy resin compositions of the present invention, curing times of about 5 minutes to about 30 minutes at a reaction temperature of from about 150 to about 220° C. are generally sufficient.

The powder coating formulation optionally, contains one or more accelerators or catalysts. Suitable such accelerators or catalysts are described in the aforementioned *Handbook of Epoxy Resins* and *Fundamentals of Powder Coating* references. Representative of these accelerators or catalysts are the amino substituted pyridines, imidazoles, metallic salts, tertiary amines, phenols, mixtures thereof and the like.

The powder coating formulation optionally, athough preferably, contains one or more particulate fillers. Fillers are used in powder coatings for a wide range of purposes, primary of which is economic, i.e. as a less expensive diluent. Other properties imparted by fillers cna include one or more of the following: handling and processing properties, impact modification, dimensional stability, moisture and chemical resistance, flame resistance, modified thermal conductivity, modified electrical properties, modified rheology, color modification and texture modification. Suitable such fillers are described in *Non-Fibrous Fillers for Epoxy Resin Formulations* presented at the 7th Electrical Insulation Conference, Chicago, Illinois. Oct. 15-19, 1967 by D.A. Shimp. Representative of these fillers are barytes ($BaSO_4$), titanium dioxide. carbon black, silica flour, calcium carbonate, mixtures thereof and the like. The particle size distribution, shape, chemical composition, surface area and use level, i.e. resin to filler ratio, can be adjusted singularly or collectively to change the resultant cured powder coating. Simple preliminary experiments with the normal capability of those skilled in the art are ordinarily performed to aid in filler choice.

The powder coating formulation optionally contains one or more pigments. Said pigments are typically used to add color to the cured powder coating. Suitable such pigments are described in *Pigments for Colouring Epoxy Powder Coatings* by Maltman and Deverell-Smith in Pigment and Resin Technology, November 1973, pp. 15–19 which is incorporated herein by reference.

The powder coating formulation optionally, although preferably, contains one or more flow control agents. Flow control agents are used in powder coatings to adjust the rheological properties of the total powder coating formulation thus insuring uniform coating film thickness, wet-out and costing of edges. Suitable such flow control agents are described in *Acrylic Flow Control Agents for the Coating Industry* by Skora in Polymers Paint and Colour Journal, Sept. 5, 1979, pp. 867–870 which is incorporated herein by reference. Most preferred as the flow control agents are the polyacrylates such as, for example, ethyl acrylate and 2-ethylhexyl acrylate copolymer, and poly(butyl acrylate).

The powder coating formulation optionally contains one or more texture control additives. Texture control additives are used in powder coatings to modify the surface characteristics of the cured powder coating. Materials which provide smooth or rough surface finishes may be employed. Glass microspheres, metal powders and polymeric powders are examples of the types of additives capable of modifying the powder coating surface to a textured finished.

The powder coating formulation optionally contains one or more air release agents. Said agents are used in powder coatings to alleviate surface defects, such as pinholes in the cured powder coating, induced by air entrainment. A most preferred air release agent is benzoin, as described in *Surface Coatings, Vol. 2 - Paints and Their Application* by The Oil and Colour Chemists' Association, Australia, published by Chapman and Hall, 1984, p. 598 which is incorporated herein by reference.

The powder coating formulation optionally contains one or more gloss control additives. Gloss control additives are used to reduce the high degree of reflected light from the typical cured epoxy resin surface. Suitable such gloss control agents are certain amorphous silicas, silicic acid and the like.

Other additives or adjuvants may be incorporated into the powder coating formulations of the present invention for their known and intended use therein. One such additive is a slip aid, as described in the aforementioned *Surface Coatings* article.

The cured product of the present invention is a powder coating over a substrate such as steel which provides excellent aqueous corrosion resistance with high mechanical strength.

The following examples are illustrative of the present invention and are not to be construed as to limiting the scope thereof in any manner.

EXAMPLE 1

A. Preparation of Polystyrene Modified Advanced Epoxy Resin

A low gloss polystyrene modified advanced epoxy resin was prepared in a 10 gallon, stainless steel Pfaudler reactor. The reactor was equipped with mechanical stirring, nitrogen supply and pressure/vacuum control with a range of 1 to 50 psia (6.9–344.7 kPa). Temperature control was provided by a dual hot and cool heat transfer fluid system circulating through the reactor jacket. All reactants were preweighed prior to charging to the reactor. A 2-inch (50.8 mm) handway fitted on the top section of the reactor was used to charge all reactants to the reactor with the exception of the monomer solution and the TBPB. The monomer solution and the TBPB were charged to auxiliary feed vessels from which they were metered into the reactor at a controlled rate during the monomer solution addition step. The TBPB flow rate control was automatically linked to the monomer solution flow rate in such a way that the ratio of their addition rates remained constant throughout the monomer solution addition step. The vacuum system was equipped with a chilled water condenser and a knockout pot to recover any unreacted monomer and other lights during the vacuum strip step. A nitrogen vapor phase was provided by repetitively reducing the pressure to 10 psia (68.9 kPa) and pressuring the reactor to 24 psia (165.5 kPa) with nitrogen during the degassing steps. The product was transferred via a drumming line from the bottom tap of the reactor through a 50 micron sock filter and into the product drums during the drumming step.

The following reactants and amounts were utilized:

| | |
|---|---|
| D.E.R. ® 383 diglycidyl ether of bisphenol A having an EEW of 180.5 commercially available from The Dow Chemical Company | 15,857 grams |
| glacial methacrylic acid | 75.7 grams |
| tertiary butyl perbenzoate (TBPB) | 317 grams |
| bisphenol A | 4,309 grams |
| advancement catalyst[1] | 26.5 grams |
| monomer solution | 12,796 grams |

[1]ethyltriphenylphosphonium acetate.acetic acid complex - 70% in methanol

The monomer solution was a mixture of the following reactants in the indicated amounts:

| | |
|---|---|
| styrene | 12,682 grams |
| glacial methacrylic acid | 114 grams |

The following reaction order and conditions were used:

| Reaction Step | Reactor Temperature | Reactor Pressure | Cumulative Time |
|---|---|---|---|
| Charge liquid D.E.R. ® 383 and methacrylic acid | ambient | 14.7 psia (101.4 kPa) | 0 min. |
| Close reactor, pad with nitrogen and start agitation | — | 23.5 psia (162 kPa) | 10 min. (600 s) |
| Heat reactor with 155° C. hot heat transfer fluid | — | 23.5 psia (162 kPa) | 15 min. (900 s) |
| Charge monomer and TBPB to respective feed vessels | — | 23.5 psia (162 kPa) | 15 min. (900 s) |
| Degas reactor three times | 137° C. | — | 46 min. (2760 s) |
| Start monomer solution and TBPB feed | 146° C. | 15.8 psia (108.9 kPa) | 1 hr. 8 min. (4080 s) |
| Reactor temperature controlled at 150 ± 5° C. | 150° C. | 16.4 psia (113.1 kPa) | 1 hr. 8 min. (4080 s) |
| Monomer solution and TBPB feed complete | 150° C. | 17.2 psia (118.6 kPa) | 2 hr. 52 min. (10320 s) |
| Start vacuum strip by slow reduction in pressure | 152° C. | — | 3 hr. 39 min. (13140 s) |
| Vacuum strip at minimum pressure | 150° C. | 0.2 psia (1.4 kPa) | 4 hr. 9 min. (14940 s) |
| Vacuum strip complete | 150° C. | 0.3 psia (2.1 kPa) | 4 hr. 19 min. (15540 s) |
| Bisphenol A charged to reactor | 153° C. | 14.7 psia (101.4 kPa) | 4 hr. 28 min. (16080 s) |
| Advancement catalyst charged to reactor | 147° C. | 10.0 psia (68.9 kPa) | 4 hr. 39 min. (16740 s) |
| Reactor degassed 4 times | — | — | 4 hr. 45 min. (17100 s) |
| Reactor heated with 190°–200° C. hot heat transfer fluid | 152° C. | 17.4 psia (120.0 kPa) | 4 hr. 51 min. (17460 s) |
| Maximum temperature reached and slow cooling started | 188° C. | 18.1 psia (124.8 kPa) | 5 hr. 32 min. (19920 s) |
| Reactor temperature controlled at 175 ± 5° C. | 175° C. | 18.5 psia (127.6 kPa) | 6 hr. 2 min. (21720 s) |
| Product drummed through 50 micron sock filter into product drums | 175° C. | — | 6 hr. 42 min. (24120 s) |

B. Preparation of Polystyrene Modified Advanced Epoxy Resin (30 pbw) and Polyester (70 pbw) Copolymer (Filled)

A portion of polystyrene modified advanced epoxy resin from A above (95.7 grams, 0.1434 equivalent) having an epoxide equivalent weight (EEW) of 667.4, a commercially available carboxylic acid functional polyester (229.54 grams, 0.1434 equivalent) (Uralac P2450, DSM Resins) having an average equivalent weight of 1600, titanium dioxide (162.59 grams, 0.5:1 filler to binder ratio) (Dupont R-900), benzoin (2.5 grams) (Uraflow B, Scado) and a polyacrylate flow control agent (9.76 grams) (Modaflow II, Monsanto) were placed in a plastic bag, sealed and dry mixed to a homogeneous dry blend. The dry-mixed formulation was then extruded in a Buss-Condux PLK 45 single screw extruder (equipped with a 46 mm diameter kneader screw operated at 120 rpm) with Zone 1 at 50° C. and Zone 2 at 100° C. The extrudate was passed through BCI Chill Rolls (6½", 165.1 mm, diameter), cooled and crushed. The crushed extrudate was then fine ground in a Brinkmann Centrifugal Grinding Mill utilizing the 24-tooth grinding attachment. The finely ground extrudate was sieved through No. 140 (150 mesh, 100 μm) standard test sieves (wire cloth). Portions of the −150 mesh powder coating formulation were applied via electrostatic spray with a Gema Ag Type 710 Laboratory Uit (set at 60–70 kV) on the 4"×12"×20 gauge (101.6 mm×304.8 mm×0.529 mm) cold rolled steel, clean treatment Parker test panels (Parker Division, Hooker Chemicals and Plastics Corporation). The electrtostatically coated panels were set in a Blue M Touchmatic convection-type oven (Model No. POM7) and cured at 180° C. (356° F.) for twenty minutes (1200 s). After removal from the oven the panels were cooled and evaluated via the following test methods: coating thickness was determined per ASTM D1186 by utilizing a Fischer Perma-Scope ES film thickness tester. Surface gloss was determined per ASTM D523 (DIN 67530) using a Mallinckrodt Multi Gloss gloss meter. Yellowness index of the surface was determined per FTMS141b Method 6131 using a Gardner XL 10 CDM Tristimulus Colorimeter. Gardner forward and reverse impact strengths were determined per ASTM D2794 using a Gardner "Coverall" Bend and Impact Tester, 46 inch (1.17 m) tube length, 0–160 in.-lb. tester, with a four pound (1.81 kg), one-half inch (12.7 mm) diameter cone. Visualization of any surface cracks at the impact sites was facilitated by application of an acidified copper sulfate ($CuSO_4$) solution for a period of 15 minutes (900 s). Impact areas were observed for copper deposits or iron-rust stains after exposure to the copper sulfate solution.

A portion of the −150 mesh powder coating formulation was evaluated for stroke cure gel time on a hot plate maintained at 180° C.±1° C. by stroking the one gram sample back and forth with a spatula until no fibers of resin adhered to the spatula when pulled up. The results of these tests are reported in Table I.

EXAMPLE 2

Preparation of Polystyrene Modified Advanced Epoxy Resin (30 pbw) and Polyester (70 pbw) Copolymer (Unfilled)

A portion of polystyrene modified advanced epoxy resin from Example 1-A (143.57 grams, 0.2151 equivalent), a commercially available carboxylic acid functional polyester (344.17 grams, 0.2151 equivalent) (Uralac P2450, DSM Resins), benzoin (2.5 grams) and a polyacrylate flow control agent (9.76 grams) were placed in a plastic bag, sealed and dry mixed to provide a homogeneous dry blend which was further processed and evaluated using the method of Example 1-B. The results are reported in Table I.

EXAMPLE 3

Preparation of Polystyrene Modified Advanced Epoxy Resin (35 pbw) and Polyester (65 pbw) Copolymer (Filled)

A portion of polystyrene modified advanced epoxy resin from Example 1-A (121.41 grams, 0.1819 equivalent), a commercially available carboxylic acid functional polyester (203.74 grms, 0.1819 equivalent) (Uralac P2610, DSM Resins) having an average equivalent weight of 1120, titanium dioxide (162.59 grams, 0.5:1 filler to binder ratio) (Dupont R-900), benzoin (2.5 grams) (Uraflow B, Scado) and a polyacrylate flow control agent (9.76 grams) (Modaflow II, Monsanto) were placed in a plastic bag, sealed and dry mixed to provide a homogeneous dry blend which was further processed and evaluated using the method of Example 1-B. The results are reported in Table I.

EXAMPLE 4

Preparation of Polystyrene Modified Advanced Epoxy Resin (35 pbw) and Polyester (65 pbw) Copolymer (Unfilled)

A portion of polystyrene modified advanced epoxy resin from Example 1-A (182.12 grams, 0.2729 equivalent), a commercially available carboxylic acid functional polyester (305.62 grams, 0.2729 equivalent) (Uralac P2610, DSM Resins), benzoin (2.5 grams) and a polyacrylate flow control agent (9.76 grams) were placed in a plastic bag, sealed and dry mixed to provide a homogeneous dry blend which was further processed and evaluated using the method of Example 1-B. The results are reported in Table I.

EXAMPLE 5

Preparation of Polystyrene Modified Advanced Epoxy Resin (50 pbw) and Polyester (50 pbw) Copolymer (Filled)

A portion of polystyrene modified advanced epoxy resin from Example 1-A (158.70 grams, 0.2378 equivalent), a commercially available carboxylic acid functional polyester (166.45 grams, 0.2378 equivalent) (Uralac P2980, DSM Resins) having an average equivalent weight of 750, titanium dioxide (162.58 grams, 0.5:1 filler to binder ratio) (Dupont R-900), benzoin (2.5 grams) (Uraflow B, Scado) and a polyacrylate flow control agent (9.76 grams) (Modaflow II, Monsanto) were placed in a plastic bag, sealed and dry mixed to provide a homogeneous dry blend which was further processed and evaluated using the method of Example 1-B. The results are reported in Table I.

EXAMPLE 6

Preparation of Polystrene Modified Advanced Epoxy Resin (50 pbw) and Polyester (50 pbw) Copolymer (Unfilled)

A portion of polystyrene modified advanced epoxy resin from Example 1-A (238.06 grams, 0.3567 equivalent), a commercially available carboxylic acid functional polyester (249.69 grams, 0.3567 equivalent) (Uralac P2980, DSM Resins), benzoin (2.5 grams) and a polyacrylate flow control agent (9.76 grams) were placed in a plastic bag, sealed and dry mixed to provide a homogeneous dry blend which was further processed and evaluated using the method of Example 1-B. The results are reported in Table I.

COMPARATIVE EXPERIMENT A

Preparation of Advanced Epoxy Resin (35 pbw) and Polyester (65 pbw) Copolymer Standard (Filled)

A portion of a commercial grade of a bisphenol A advanced diglycidyl ether of bisphenol A (127.85 grams, 0.1761 equivalent) (DER 662UH, Dow Chemical Company) having an EEW of 726, a commercially available carboxylic acid functional polyester (197.27 grams, 0.1761 equivalent) (Uralac P2610, DSM Resins) having an average equivalent weight of 1120, titanium dioxide (162.59 grams, 0.5:1 filler to binder ratio) (Dupont R-900), benzoin, (2.5 grams) (Uraflow B, Scado) and a polyacrylate flow control agent (9.76 grams) (Modaflow II, Monsanto) were placed in a plastic bag, sealed and dry mixed to provide a homogeneous dry blend which was further processed and evaluated using the method of Example 1-B. The results are reported in Table I.

COMPARATIVE EXPERIMENT B

Preparation of Advanced Epoxy Resin (35 pbw) and Polyester (65 pbw) Copolymer Standard (Unfilled)

A portion of a commercial grade of a bisphenol A advanced diglycidyl ether of bisphenol A (191.82 grams, 0.2642 equivalent) (DER 662UH, Dow Chemical Company) a commercially available carboxylic acid functional polyester (295.92 grams, 0.2642 equivalent)

(Uralac P2610, DSM Resins), benzoin (2.5 grams) (Uraflow B, Scado) and a polyacrylate flow control agent (9.76 grams) (Modaflow II, Monsanto) were placed in a plastic bag, sealed and dry mixed to provide a homogeneous dry blend which was further processed and evaluated using the method of Example 1-B. The results are reported in Table I.

COMPARATIVE EXPERIMENT C

Preparation of Advanced Epoxy Resin (30 pbw) and Polyester (70 pbw) Copolymer Standard (Filled)

A portion of a commercial grade of a bisphenol A advanced diglycidyl ether of bisphenol A (101.49 grams, 0.1398 equivalent) (DER 662UH, Dow Chemical Company) having an EEW of 726, a commercially available carboxylic acid functional polyester (223.68 grams, 0.1398 equivalent) (Uralac P2450, DSM Resins) having an average equivalent weight of 1600, titanium dioxide (162.50 grams, 0.5:1 filler to binder ratio) (Dupont R-900), benzoin (2.5 grams) (Uraflow B, Scado) and a polyacrylate flow control agent (9.76 grams) (Modaflow II, Monsanto) were placed in a plastic bag, sealed and dry mixed to provide a homogeneous dry blend which was further processed and evaluated using the method of Example 1-B. The results are reported in Table I.

COMPARATIVE EXPERIMENT D

Preparation of Advanced Epoxy Resin (30 pbw) and Polyester (70 pbw) Copolymer Standard (Unfilled)

A portion of a commercial grade of a bisphenol A advanced diglycidyl ether of bisphenol A (152.23 grams, 0.2097 equivalent) (DER 662UH, Dow Chemical Company) a commerically available carboxylic acid functional polyester (335.51 grams, 0.2097 equivalent) (Uralac P2450, DSM Resins), benzoin (2.5 grams) (Uraflow B, Scado) and a polyacrylate flow control agent (9.76 grams) (Modaflow II, Monsanto) were placed in a plastic bag, sealed and dry mixed to provide a homogeneous dry blend which was further processed and evaluated using the method of Example 1-B. The results are reported in Table I.

COMPARATIVE EXPERIMENT E

Preparation of Advanced Epoxy Resin Standard Powder Coating (Filled)

A portion of a commercial grade of a bisphenol A advanced diglycidyl ether of bisphenol A (400.0 grams, 0.5510 equivalent) (DER 662UH, Dow Chemical Company) having an EEW of 726, dicyandiamide (7.59 grams), 83 percent by weight dicyandiamide and 17 percent by weight 2-methylimidazole mixture (4.8 grams), titanium dioxide (200 grams, 0.5:1 filler to binder ratio) (Dupont R-900), benzoin (3.12 grams) (Uraflow B), and a polyacrylate flow control agent (12.0 grams) (Modaflow II, Monsanto) were placed in a plastic bag, sealed and dry mixed to provide a homogeneous dry blend which was further processed and evaluated using the method of Example 1-B. The results are reported in Table I.

COMPARATIVE EXPERIMENT F

Preparation of Advanced Epoxy Resin Standard Powder Coating (Unfilled)

A portion of a commercial grade of a bisphenol A advanced diglycidyl ether of bisphenol A (550.0 grams, 0.7576 equivalent) (DER 662UH, Dow Chemical Company) having an EEW of 726, dicyandiamide (10.43 grams), 83 percent by weight dicyandiamide and 17 percent by weight 2-methylimidazole mixture (6.6 grams), benzoin (2.89 grams) (Uraflow B), and a polyacrylate flow control agent (11.0 grams) (Modaflow II, Monsanto) were placed in the plastic bag, sealed and dry mixed to provide a homogeneous dry blend which was further processed and evaluated using the method of Example 1-B. The results are reported in Table I.

TABLE I

| Designation of Formulation | Film Thickness mils (mm) | Gloss Degrees/ Percent | Gardner Impact Forward/Reverse in-lb (J) | Stroke Cure Gel Time @ 180° C. (sec) | Yellowness Index | Coating Appearance[1] |
|---|---|---|---|---|---|---|
| Example 1 | 1.7 (0.043) | 20/29.6 60/73.6 85/76.5 | 160/160 (18/18) | 316.1 | −0.1−+1.6 | flawless |
| Example 2 | 1.14 (0.029) | 20/58.6 60/108.8 85/89.3 | 160/160 (18/18) | 276.7 | — | flawless |
| Example 3 | 1.6 (0.041) | 20/48.2 60/88.5 85/91.5 | 160/160 (18/18) | 216.4 | −0.4−+0.2 | 2 |
| Example 4 | 1.2 (0.025) | 20/81.4 60/118.3 85/96.2 | 160/160 (18/18) | 185.0 | — | 2 |
| Example 5 | 1.4 (0.036) | 20/38.7 60/81.6 85/83.7 | 160/160 (18/18) | 132.3 | −1.4−−0.4 | 2 |
| Example 6 | 1.13 (0.029) | 20/54.8 60/96.8 85/92.2 | 160/160 (18/18) | 96.6 | — | 2 |
| Comp. Expt. A | 1.7 (0.043) | 20/76.6 60/92.7 85/96.5 | 160/160 (18/18) | 272.4 | +0.4−0.7 | 1 |
| Comp. Expt. B | 1.7 (0.043) | 20/111.3 60/131.8 85/97.9 | 160/160 (18/18) | 195.7 | — | 1 |
| Comp. Expt. C | 1.56 (0.040) | 20/30.4 60/74.6 85/75.3 | 160/160 (18/18) | 326.5 | 0.0−+0.7 | 2 |
| Comp. Expt. D | 1.17 (0.030) | 20/62.3 60/112.4 85/88.6 | 160/160 (18/18) | 278.2 | — | 2 |

TABLE I-continued

| Designation of Formulation | Film Thickness mils (mm) | Gloss Degrees/ Percent | Gardner Impact Forward/Reverse in-lb (J) | Stroke Cure Gel Time @ 180° C. (sec) | Yellowness Index | Coating Appearance[1] |
|---|---|---|---|---|---|---|
| Comp. Expt. E | 1.6 (0.041) | 20/24.1 60/69.2 85/71.2 | 160/160 (18/18) | 383.6 | +0.9-1.6 | 2 |
| Comp. Expt. F | 1.3 (0.033) | 20/95.6 60/123.7 85/95.9 | 160/160 (18/18) | 246.1 | — | 1 |

[1] 1 = slight to barely perceptible textured surface  2 = pronounced textured surface (orange peel)

EXAMPLE 7

Portions of the powder coating formulations of Example 4, Comparative Experiment B and Comparative Experiment F (6.50 grams) were placed in 2-inch diameter circular aluminum dishes then cured in an oven for 30 minutes (1800 s) at 180° C. The resulting circular clear unfilled castings were demolded and weighed after removal from the oven. A casting from each respective cured resin was added to a glass jar containing deionized water, 1 percent by weight aqueous sodium hydroxide and 1 normal hydrochloric acid. The jars were then maintained in an oven at 92° C. and the samples were removed and weighed at the indicated intervals. The results are reported in Table II.

TABLE II

| | Percent Weight Gain | | |
|---|---|---|---|
| | Example 4 | Comp. Expt. B | Comp. Expt. F |
| Hours of Exposure to 92° C. Deionized Water | | | |
| 24 | 1.84 | 2.31 | 3.12 |
| 41 | 2.03 | 2.55 | 4.40 |
| 72 | 2.36 | 2.87 | 5.17 |
| Hours of Exposure to 92° C. Aqueous NaOH (1 pbw) | | | |
| 24 | 0.81 | 1.73 | 2.94 |
| 41 | 2.88 | 1.76 | 5.26 |
| 72 | 1.35[1] | 1.27[1] | 4.68[1] |
| Hours of Exposure to 92° C. Aqueous HCl (1N) | | | |
| 24 | 1.42 | 1.61 | 3.87 |
| 41 | 1.42 | 1.95 | 5.59[2] |
| 72 | 1.46 | 1.84[2] | 6.67[2] |

[1] surface chalking
[2] surface pitting

I claim:

1. An advanced epoxy resin and polyester blend which comprises the product resulting from
   (I) polymerizing in the presence of a catalytic quantity of a suitable polymerization catalyst
      (A) the reaction product of
         (1) at least one diglycidyl ether of a dihydric phenol with
         (2) from about 0.001 to about 0.05 equivalent per epoxide equivalent contained in component (A-1) of a compound containing a group reactive with an epoxide group and a polymerizable ethylenically unsaturated group selected from acrylic acid, methacrylic acid and monoesters of $\alpha,\beta$-unsaturated acids; with
      (B) a monomer feed consisting of
         (1) at least one vinyl aromatic monomer represented by the formula

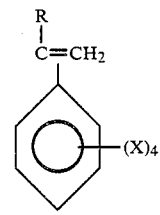

wherein R is hydrogen or a methyl group and each X is independently hydrogen, bromine, chlorine, or a hydrocarbyl or hydrocarbyloxy group having from 1 to about 10 carbon atoms; in an amount of from about 31 to about 60 percent by weight of the total weight of components (A), (B) and (C);
         (2) from about 0.001 to about 0.05 equivalent per epoxide equivalent contained in component (A-1) of a compound containing a group reactive with an epoxide group and a polymerizable ethylenically unsaturated group selected from acrylic acid, methacrylic acid and monoesters of $\alpha,\beta$-unsaturated dicarboxylic acids; and
         (3) a hydroxyalkyl acrylate or methacrylate or an alkyl acrylate or methacrylate in an amount of from about zero to about 15 percent by weight based on total weight of components (B-1) and (B-3); and
   (II) advancing, in the presence of a catalytic quantity of a suitable advancement catalyst, the polymerized product from step (I) with
      (C) at least one dihydric phenol in an amount of from about 0.125 to about 0.80 hydroxyl equivalents per epoxide equivalent contained in component (A-1); and
   (III) combining the advanced epoxy resin from step (II) with
      (D) at least one acid functional polyester or hydroxyl functional polyester or a combination thereof in an amount sufficient to provide a mole ratio of epoxide groups contained in the product produced in step (II) to acid and/or hydroxyl groups of from about 0.9:1 to about 1.1:1.

2. An advanced epoxy resin and polyester blend of claim 1 wherein
   (i) component (I-A-1) is represented by the formulas

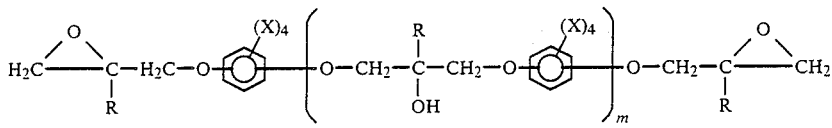 (I)

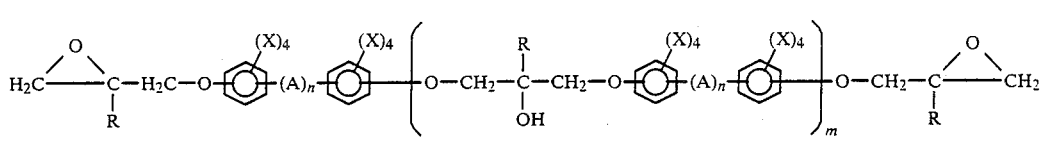 (II)

wherein A is a divalent hydrocarbon group having from one to about 10 carbon atoms

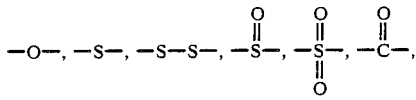

each X is independently hydrogen, bromine, chlorine, or a hydrocarbyl or hydrocarbyloxy group having from 1 to about 10 carbon atoms; each R is independently hydrogen or a methyl group; m has a value from zero to about 5, and n has a value of zero or 1;

(ii) component (I-A-2) is a compound which contains a hydroxyl group, carboxylic acid group or an amide group as the group which is reactive with an epoxide group and is present in an amount which provides from about 0.005 to about 0.025 equivalent per epoxide equivalent contained in component (I-A-1);

(iii) component (I-B-2) is a compound which contains a hydroxyl group, carboxylic acid group or an amide group as the group which is reactive with an epoxide group and is present in an amount which provides from about 0.005 to about 0.025 equivalent per epoxide equivalent contained in component (I-A-1);

(iv) component (I-B-3) is represented by the following formula

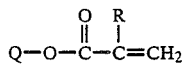 (IV)

wherein R is hydrogen or a methyl group and Q is a monovalent hydrocarbyl group having from 1 to about 25 carbon atoms or a hydroxyalkyl group having from 2 to about 25 carbon atoms and is present in an amount of from about 1 to about 5 percent by weight based upon the total weight of components (I-B-1) and (I-B-3); and (v) component (II-C) is represented by the following formulas

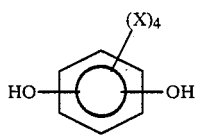 (V)

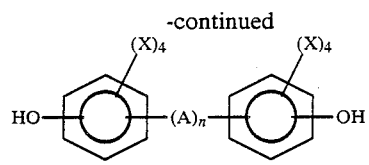 (VI)

wherein A, X and n are as defined above and is present in an amount which provides from about 0.375 to about 0.50 hydroxyl equivalent per epoxide equivalent contained in component (I-A-1).

3. An advanced epoxy resin and polyester blend of claim 2 wherein
   (i) component (I-A-1) is represented by formula II; and
   (ii) component (II-C) is represented by formula VI.

4. An advanced epoxy resin and polyester blend of claim 3 wherein
   (i) component (I-A-1) is a diglycidyl ether of bisphenol A;
   (ii) component (I-A-2) is methacrylic acid, acrylic acid or combination thereof;
   (iii) component (I-B-1) is styrene, vinyl toluene or combination thereof;
   (iv) component (I-B-2) is methacrylic acid, acrylic acid or combination thereof;
   (v) component (II-C) is bisphenol A (4,4'-isopropylidenediphenol); and
   (vi) component (III-D) is an acid functional polyester, a hydroxy functional polyester, or combination thereof.

5. The product resulting from curing a composition containing an advanced eposy resin and polyester blend of claim 1.

6. The product resulting from curing a composition containing an advanced epoxy resin and polyester blend of claim 2.

7. The product resulting from curing a composition containing an advanced epoxy resin and polyester blend of claim 3.

8. The product resulting from curing a composition containing an advanced epoxy resin and polyester blend of claim 4.

9. A powder coating composition containing an advanced epoxy resin and polyester blend of claim 1 and optionally one or more components selected from accelerators or catalysts, fillers, pigments, flow control agents, gloss control additives, texture control additives, air release agents and the like.

10. A powder coating composition containing an advanced epoxy resin and polyester blend of claim 2 and optionally one or more components selected from accelerators or catalysts, fillers, pigments, flow control agents, gloss control additives, texture control additives, air release agents and the like.

11. A powder coating composition containing an advanced epoxy resin and polyester blend of claim 3 and optionally one or more components selected from accelerators or catalysts, fillers, pigments, flow control agents, gloss control additives, texture control additives, air release agents and the like.

12. A powder coating composition containing an advanced epoxy resin and polyester blend of claim 4 and optionally one or more components selected from accelerators or catalysts, fillers, pigments, flow control agents, gloss control additives, texture control additives, air release agents and the like.

13. An article resulting from coating a substrate with and subsequently curing thereon a powder coating composition of claim 9.

14. An article resulting from coating a substrate with and subsequently curing thereon a powder coating composition of claim 10.

15. An article resulting from coating a substrate with and subsequently curing thereon a powder coating composition of claim 11.

16. An article resulting from coating a substrate with and subsequently curing thereon a powder coating composition of claim 12.

* * * * *